UNITED STATES PATENT OFFICE.

BENJAMIN F. STEPHENS, OF BROOKLYN, NEW YORK.

IMPROVEMENT IN PUTTING UP COD-FISH FOR USE.

Specification forming part of Letters Patent No. 87,986, dated March 16, 1869.

*To all whom it may concern:*

Be it known that I, BENJAMIN F. STEPHENS, of the city of Brooklyn, Kings county, New York, have invented and made a new and useful Improvement in the Preparation of Cod-Fish, and other Animal Substances; and I do hereby declare the following to be a full, clear, and exact description of the same, and of the features that distinguish it from other methods.

The object of this invention is to remove the oily and watery portions of cod-fish and other animal substances, and then preserve the latter from decomposition, and in a compact form, without the desiccation heretofore resorted to. I thereby preserve the taste, and keep the material in a better condition than heretofore for immediate use.

I take the cod or other fish or animal substance, and remove all refuse matter, such as skin, bones, fat, &c. I then grind up such material, or cut it to the desired fineness. After this, the watery portions, blood, and oily matter are to be pressed out, to whatever extent may be necessary or desirable, and the material is then to be treated with glycerine, to aid in preserving the fish or other animal substances.

I prefer to regrind said material, and in that condition moisten it with glycerine, or any of its compounds that will act to keep the fish or other material moist and prevent desiccation.

The fish or other material is then pressed into a compact mass, and put into any suitable wrapper, of tin-foil or other material, or boxed.

If desired, the fish, or other material, after being ground or torn up, may be subjected to a partial drying operation, in a chamber or room, previous to the pressing.

Fish and other animal substances treated in this manner are preserved, and decomposition checked and arrested, and, at the same time, the same are in a condition for use, because dryness is prevented, and glycerine has an affinity for water; hence the mass may easily be cooked.

By expressing watery portions, the transportation of useless material is avoided, and the absence of such materials tends to prevent decomposition.

The atmosphere being largely excluded tends also to check decomposition, the glycerine acting to prevent the contact of the atmosphere.

What I claim, and desire to secure by Letters Patent, is—

The mode of preparing fish and animal substances by the use of glycerine after the watery portions have been removed, substantially as set forth.

In witness whereof I have hereunto set my signature this 6th day of February, A. D. 1869.

BENJ. F. STEPHENS.

Witnesses:
   CHAS. H. SMITH,
   GEO. T. PINCKNEY.